United States Patent
Faustino et al.

(10) Patent No.: US 11,864,056 B2
(45) Date of Patent: Jan. 2, 2024

(54) DEVELOPING A FINGERPRINT MAP FOR DETERMINING AN INDOOR LOCATION OF A WIRELESS DEVICE

(71) Applicant: T-Mobile USA, Inc., Bellevue, WA (US)

(72) Inventors: Narciso Faustino, McKinney, TX (US); Kevin Hinson, Seattle, WA (US); Jie Hui, Mercer Island, WA (US); Antoine Tran, Bellevue, WA (US); Bryan Yang, Seattle, WA (US); Doru Culiac, Bellevue, WA (US)

(73) Assignee: T-MOBILE USA, INC., Bellevue, WA (US)

( * ) Notice: Subject to any disclaimer, the term of this patent is extended or adjusted under 35 U.S.C. 154(b) by 0 days.

(21) Appl. No.: 17/967,798

(22) Filed: Oct. 17, 2022

(65) Prior Publication Data
US 2023/0044777 A1 Feb. 9, 2023

Related U.S. Application Data

(63) Continuation of application No. 17/183,715, filed on Feb. 24, 2021, now Pat. No. 11,496,860.
(Continued)

(51) Int. Cl.
*H04W 4/02* (2018.01)
*G01S 5/02* (2010.01)
*G01S 5/00* (2006.01)

(52) U.S. Cl.
CPC ............. *H04W 4/023* (2013.01); *G01S 5/013* (2020.05); *G01S 5/0252* (2013.01); *H04W 4/025* (2013.01)

(58) Field of Classification Search
CPC ....... H04W 4/029; H04W 4/33; H04W 4/021; H04W 4/024; H04W 64/00; H04W 4/02;
(Continued)

(56) References Cited

U.S. PATENT DOCUMENTS

| 8,526,368 B2 | 9/2013 | Finlow-Bates et al. |
| 8,559,975 B2 | 10/2013 | Lin et al. |

(Continued)

FOREIGN PATENT DOCUMENTS

| CA | 3065721 C | 8/2022 |
| EP | 1115262 A1 | 7/2001 |
| GB | 2574602 A | 12/2019 |

OTHER PUBLICATIONS

Davidson, P. and R. Piche, "A Survey of Selected Indoor Positioning Methods for Smartphones," IEEE Communications Surveys & Tutorials, 2016, 24 pages.https://tutcris.tut.fi/portal/files/11073461/main_2_column.pdf.
(Continued)

*Primary Examiner* — Kwasi Karikari

(57) ABSTRACT

Techniques are described herein for developing a fingerprint map that may be used for 3D indoor localization. In one example, a network server may leverage a building footprint from an open source database with signal measurements taken by probing user devices from signal sources such as access point (AP) devices. The network server may use the signal measurements to remotely calculate corresponding 3D positions of the AP devices in a particular building. Further, the network server may use the building footprint and the calculated 3D positions of the AP devices as references for developing the fingerprint map for 3D indoor localization.

20 Claims, 10 Drawing Sheets

Related U.S. Application Data

(60) Provisional application No. 63/013,970, filed on Apr. 22, 2020.

(58) Field of Classification Search
CPC ....... H04W 4/023; H04W 4/80; H04W 4/025; H04W 4/027; H04W 4/026; H04W 4/40; H04W 4/022; H04W 88/02
See application file for complete search history.

(56) References Cited

U.S. PATENT DOCUMENTS

| | | | |
|---|---|---|---|
| 9,301,100 | B1 | 3/2016 | Jampani et al. |
| 10,176,718 | B1 * | 1/2019 | Mazuir .................. G08G 1/205 |
| 11,069,082 | B1 | 7/2021 | Afrouzi et al. |
| 2008/0281839 | A1 | 11/2008 | Bevan et al. |
| 2012/0072110 | A1 | 3/2012 | Venkatraman |
| 2012/0136623 | A1 | 5/2012 | Edge et al. |
| 2012/0149388 | A1 | 6/2012 | West et al. |
| 2012/0224770 | A1 | 9/2012 | Strassenburg-Kleciak |
| 2014/0244163 | A1 | 8/2014 | Zhao et al. |
| 2014/0274151 | A1 | 9/2014 | Pattabiraman et al. |
| 2015/0043325 | A1 | 2/2015 | Tsukamoto et al. |
| 2016/0127209 | A1 | 5/2016 | Singh et al. |
| 2016/0302050 | A1 | 10/2016 | Blando et al. |
| 2017/0013409 | A1 | 1/2017 | Cerchio et al. |
| 2017/0300973 | A1 | 10/2017 | Jones et al. |
| 2017/0318422 | A1 | 11/2017 | Kokkonen |
| 2017/0366943 | A1 | 12/2017 | Yoon et al. |
| 2018/0091946 | A1 | 3/2018 | Venkatraman et al. |
| 2018/0109921 | A1 | 4/2018 | Cerchio et al. |
| 2018/0180706 | A1 | 6/2018 | Li et al. |
| 2019/0182627 | A1 | 6/2019 | Thoresen et al. |
| 2019/0375094 | A1 | 12/2019 | Kim et al. |
| 2020/0018812 | A1 | 1/2020 | Lindquist et al. |
| 2020/0228943 | A1 | 7/2020 | Martin et al. |
| 2021/0063163 | A1 | 3/2021 | Huberman et al. |
| 2021/0279417 | A1 | 9/2021 | Delaney |
| 2021/0325189 | A1 | 10/2021 | Faustino et al. |
| 2021/0329407 | A1 | 10/2021 | Culiac et al. |
| 2021/0337353 | A1 | 10/2021 | MacKaay et al. |
| 2021/0337354 | A1 | 10/2021 | Faustino et al. |

OTHER PUBLICATIONS

Jang, Beakcheol and Hyunjung Kim, "Indoor Positioning Technologies Without Offline Fingerprinting Map: A Survey," IEEE Communications Surveys & Tutorials ( vol. 21, Issue: 1, Firstquarter 2019), 21 pages.https://ieeexplore.ieee.org/abstract/document/8451859.

Jiang et al,. "Autonomous Robotic Monitoring of Underground Cable Systems," 12th International Conference on Advanced Robotics, Sep. 2005, pp. 673-679.

Langlois, et al., "Indoor Localization with Smartphones: Harnessing the Sensor Suite in Your Pocket," IEEE Consumer Electronics Magazine ( vol. 6, Issue: 4, Oct. 2017), https://ieeexplore.ieee.org/document/8048717.

Laput, et al., "EMSense: Touch Recognition of Uninstrumented, Electrical and Electromechanical Objects," ACM User Interface Software and Technology Symposium, Nov. 8-11, 2015, 10 pages.

Li et al., "ID-Match: A Hybrid Computer Vision and RFID System for Recognizing Individuals in Groups," ACM Conference on Human Factors in Computing Systems (CHI), May 7-12, 2016, 12 pages.

Li et al., "IDSense: A Human Object Interaction Detection System Based on Passive UHF RFID," ACM Conference on Human Factors in Computing Systems (CHI), Apr. 18-24, 2015, 10 pages.

Mariakakis et al., "Sail: Single access point-based indoor localization," ACM MobiSys 2014, 14 pages.

Pradhan, et al, "Smartphone-based Acoustic Indoor Space Mapping," Proc. ACM Interact. Mob. Wearable Ubiquitous Technol. 2, 2, Article 75 (Jun. 2018), 26 pages.

Pradhan, et al., "(Stable) virtual landmarks: Spatial dropbox to enhance retail experience", 2014 Sixth International Conference on Communication Systems and Networks (COMSNETS), Bangalore, 2014, pp. 1-8.

Roy, et al., I am a smartphone and I can tell my user's walking direction, ACM MobiSys 2014, 14 pages.

Sen, et al., "Avoiding multipath to revive inbuilding WiFi localization," ACM MobiSys 2013, 14 pages.

Shu, et al., "Last-Mile Navigation Using Smartphones," ACM MobiCom 2018, 13 pages.

Simultaneous localization and mapping (2020), 8 pages. https://en.wikipedia.org/wiki/Simultaneous_localization_and_mapping.

U.S. Appl. No. 17/074,279, Final Office Action dated Apr. 20, 2022, 76 pages.

U.S. Appl. No. 17/074,279, Notice of Allowance dated Jun. 21, 2022, 87 pages.

U.S. Appl. No. 17/074,279, Office Action dated Nov. 17, 2021, 80 pages.

U.S. Appl. No. 17/074,279, Supplemental Notice of Allowance dated Jul. 6, 2022, 10 pages.

U.S. Appl. No. 17/183,715, Notice of Allowance dated May 4, 2022, 18 pages.

U.S. Appl. No. 17/183,715, Notice of Allowance dated Jun. 13, 2022, 17 pages.

U.S. Appl. No. 17/183,715, Office Action dated Jan. 4, 2022, 27 pages.

U.S. Appl. No. 17/192,382, Final Office Action dated Aug. 4, 2022, 39 pages.

U.S. Appl. No. 17/192,382, Office Action dated May 24, 2022, 42 pages.

U.S. Appl. No. 17/225,841, Office Action dated Sep. 23, 2022, 73 pages.

Wang, et al., "No need to war-drive: unsupervised indoor localization," ACM MobiSys 2012, 14 pages.

Wang, et al., "Indoor-Outdoor Detection Using a Smart Phone Sensor," Sensors (Basel). Oct. 2016; 16(10): 1563, 24 pages. https://www.ncbi.nlm.nih.gov/pmc/articles/PMC5087352/.

U.S. Appl. No. 17/074,279, Notice of Allowance dated Apr. 26, 2023, 113 pages.

U.S. Appl. No. 17/074,279, Office Action dated Nov. 10, 2022, 97 pages.

U.S. Appl. No. 17/192,382, Notice of Allowance dated Apr. 13, 2023, 44 pages.

U.S. Appl. No. 17/192,382, Notice of Allowance dated May 30, 2023, 45 pages.

U.S. Appl. No. 17/192,382, Office Action dated Dec. 8, 2022, 47 pages.

U.S. Appl. No. 17/225,841, Final Office Action dated Feb. 14, 2023, 61 pages.

U.S. Appl. No. 17/225,841, Non Final Office Action dated Jun. 22, 2023, 73 pages.

U.S. Appl. No. 17/225,937, Office Action dated Feb. 3, 2023, 66 pages.

U.S. Appl. No. 17/074,279, Notice of Allowability dated Jul. 20, 2023, 72 pages.

U.S. Appl. No. 17/192,382, Notice of Allowance dated Jul. 11, 2023, 47 pages.

U.S. Appl. No. 17/225,937, Final Office Action dated Aug. 17, 2023, 33 pages.

* cited by examiner

DEVELOPING A FINGERPRINT MAP FOR DETERMINING AN INDOOR LOCATION OF A WIRELESS DEVICE

CROSS-REFERENCE TO RELATED PATENT APPLICATIONS

This application is a continuation of U.S. application Ser. No. 17/183,715, filed Feb. 24, 2021 and titled "Developing a Fingerprint Map for Determining an Indoor Location of a Wireless Device," which claims the benefit of U.S. Provisional Patent Application No. 63/013,970, filed on Apr. 22, 2020, and titled "Establishing 3D Coordinates for Generating Floor-by-floor Mapping of an Indoor Structure," which is hereby incorporated by reference in its entirety.

BACKGROUND

Deriving an accurate indoor location of a wireless device has been an increasingly important topic of mobile wireless devices. Despite research and development efforts, enabling and providing accurate indoor location capability remains a challenging topic. Limitations of current indoor location systems may be in regard to system's performance inadequacy or due to requirements for substantial infrastructure to support desired capabilities. The desired capabilities may not be supported by processing power of the wireless device. As such, additional outside structures may be provided to support the desired capabilities.

Global Positioning System (GPS) and other satellite-based navigational systems have some limitations including complete blocking or attenuation of their signals in indoor locations. In this regard, Institute of Electrical and Electronics Engineers' (IEEE) 802.11 standards based indoor location technologies have attracted a lot of attention given wide deployment of wireless local area network (WLAN) infrastructure. The WLAN infrastructure may provide wireless signals that can be used as reference points for determining the physical location of the wireless device.

BRIEF DESCRIPTION OF THE DRAWINGS

The detailed description is described with reference to the accompanying figures, in which the leftmost digit(s) of a reference number identifies the figure in which the reference number first appears. The use of the same reference numbers in different figures indicates similar or identical items.

DETAILED DESCRIPTION

Figure 1:
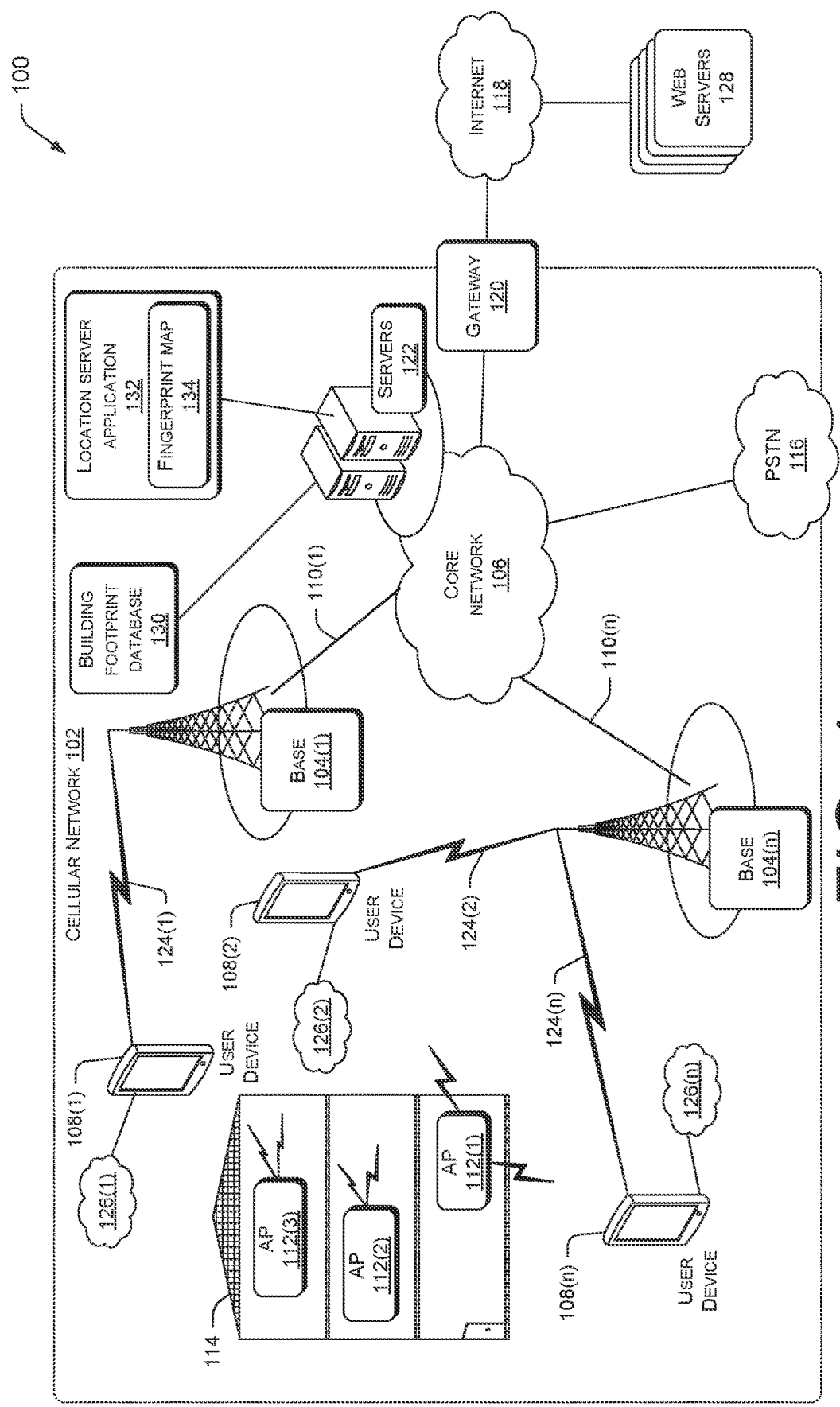
FIG. 1 is a diagram of an example cellular network environment, in accordance with at least one embodiment.

This disclosure is directed to techniques for developing a fingerprint map that may be used for 3D indoor localization. As a first step for developing the fingerprint map of a particular building, a network server may download a corresponding building footprint from an open source such as OpenStreetMap.org™. The building footprint may include vector coordinates of a building plan, elevation, and/or section where each one of the vector coordinates may be associated with a magnitude, direction, an initial node, a terminal node, and corresponding GPS locations of the initial and terminal nodes. With the building footprint, the network server may identify user devices that are located near the particular building. The identified user devices may be requested to scan and measure signals from surrounding signal sources such as access point (AP) devices. The network server may use these signal measurements to calculate corresponding 3D positions of the AP devices. By using the building footprint (e.g., vector coordinates of the building plan) and the calculated 3D positions of the AP devices, the network server may be able to remotely identify the AP devices that are positioned within the building. In one example, the network server may leverage the vector coordinates of the building footprint, calculated 3D positions of the indoor AP devices, and signal measurements taken from the AP devices to develop the fingerprint map. The fingerprint map may include reference data points where each reference data point may represent a pairing of a navigated physical location and signal measurements taken at the navigated physical location. As described herein, the signal measurements may include, but is not limited to, Received Signal Strength Indicator (RSSI), Reference Signal Received Power (RSRP), Time of Arrival (ToA), Angle of Arrival (AoA), Angle of Departure (AoD), and/or so forth.

In one example, a plurality of probing user devices that are within a threshold distance (e.g., 50 meters radius value) from a particular node of a building footprint may be used to scan, identify, and measure signals that may be transmitted by the AP devices. By using signal measurements from different probing user devices in a trilateration method, the 3D position of the transmitting AP device may be calculated. Correlating this calculated 3D position with the known GPS locations of the probing user devices, GPS locations of the vector coordinates of the building plan/elevation/section, and determined distance between the probing user devices and the vector coordinates, the calculated 3D position of the transmitting AP device may be determined to be located within or outside the building.

To generate the reference data points of the building fingerprint map with minimal human deployment efforts, a localization and mapping solution such as a simultaneous localization and mapping (SLAM) algorithm may be used. The SLAM algorithm may solve a problem of constructing a map for an unknown environment (e.g., indoor space) and, at the same time, determining a physical location of the user device when the user device is navigating a mapped environment. By pairing the signal measurements with this SLAM algorithm (e.g., pairing RSSI measurement with each navigated physical location), a WiFi based-SLAM algorithm may be created to facilitate speedy construction of the reference data points in the fingerprint map. In one example, the construction of the reference data points in the fingerprint map may use the vector coordinates as references.

The techniques described herein may be implemented in a number of ways. Example implementations are provided below with reference to the following figures.

Example Network Environment

FIG. 1 is a diagram of an example cellular network environment 100 for implementing techniques to leverage availability of building footprints from an open source building footprint database to remotely determine locations of radio access network (RAN) devices such as AP devices that may be positioned within a particular building. Further, the network environment 100 may implement techniques to use the building footprints, a calculated 3D position of the indoor AP devices, and signal measurements from the AP devices to develop the fingerprint map of the particular building.

The cellular network environment 100 includes a cellular network 102 that is provided by a wireless telecommunication carrier. It is noted that, although the present discussion refers to a cellular network, other network architectures may be used in place of the cellular network shown and described with respect to FIG. 1. The cellular network 102 includes cellular network base stations 104(1)-104(n) and a core network 106. Only two base stations are shown for simplicity and the cellular network 102 may include any number of base stations. The cellular network 102 provides telecommunication and data communication in accordance with one or more technical standards, such as Enhanced Data Rates for GSM Evolution (EDGE), Wideband Code Division Multiple Access (W-CDMA), HSPA, LTE, LTE-Advanced, Code Division Multiple Access 2000 (CDMA-2000), and/or so forth.

The base stations 104(1)-104(n) are responsible for handling voice and data traffic between user devices, such as user devices 108(1)-108(n), and the core network 106. The individual base stations 104(1)-104(n) may be communicatively connected to the core network 106 via a corresponding backhaul 110(1)-110(n). The backhauls 110(1)-110(n) may be implemented using copper cables, fiber optic cables, microwave radio transceivers, and/or the like.

In one example, the user devices 108(1)-104(n) may be configured to probe and/or establish wireless connections with AP devices 112(1)-112(3) that may be located within a building 114. The wireless connections are made by way of any method known in the art, such as WiFi™, Bluetooth®, Wireless Mesh Network (WMN), Zigbee™ and/or so forth.

The AP devices 112(1)-112(3) may include physical devices that can create a wireless local area network (WLAN) in the building 114. As described herein, the user devices 108(1)-108(n) may be configured to probe and measure (WiFi) signals of the AP devices 112(1)-112(3), identify the AP devices 112(1)-112(3) through their corresponding media access control (MAC) addresses, and send these measured signals and their associated MAC addresses to a network server (e.g., network server 122) or a remote management unit through the core network 106. As further described below, the network server 122 may use these signal measurements in a trilateration method to calculate 3D positions of the AP devices 112(1)-112(3) and pin the calculated 3D positions of the AP devices 112(1)-112(3) in a downloaded building footprint/plan of the building 114. As described herein, pinning of the calculated 3D position of the AP devices 112(1)-112(3) may be similar to adding vector coordinates in the building footprint/plan.

The core network 106 also provides telecommunication and data communication services to the user devices 108 (1)-108(n). In the present example, the core network 106 connects the user devices 108(1)-108(n) to other telecommunication and data communication networks, such as a public switched telephone network (PSTN) 116, and Internet 118 (via a gateway 120). The core network 106 includes one or more servers 122 that implement network components. For example, the network components (not shown) may include a serving GPRS support node (SGSN) that routes voice calls to and from the PSTN 116, and a Gateway GPRS Support Node (GGSN) that handles the routing of data communication between external packet-switched networks and the core network 106 via gateway 120. The network components may further include a Packet Data Network (PDN) gateway (PGW) that routes data traffic between the GGSN and the Internet 118.

The user devices 108(1)-108(n) may include electronic communication devices such as a cellular phone, a smartphone, a session initiation protocol (SIP) phone, a laptop, a personal digital assistant (PDA), a satellite radio, GPS, a multimedia device, a video device, a camera, a game console, a tablet, a smart device, a wearable device, or any other similar functioning device. The user devices 108(1)-108(n) may also be referred to as a station, a mobile station, a subscriber station or unit, a wireless unit, a mobile device, a wireless device, an access terminal, a handset, a user agent, a mobile user, or other suitable terminology. Any electronic device that is capable of using the wireless communication services that are provided by the cellular network 102 may be communicatively linked to the cellular network 102. For example, a user may use one or more user devices 108(1)-108(n) to make voice calls, send and receive text messages, and download content from the Internet 118. The user devices 108(1)-108(n) are communicatively connected to the core network 106 via one or more base stations 104(1)-104(n). Accordingly, communication traffic between user devices 108(1)-108(n) and the core network 106 are handled by wireless interfaces 124(1)-124(n) that connect the user devices 108(1)-108(n) to the base stations 104(1)-104(n).

Each one of the user devices 108(1)-108(n) is also capable of connecting to an external network, including the Internet 118, via a wireless network connection other than the cellular network wireless services. As shown, user device 108(1) includes a connection to network 126(1), user device 108(2) includes a connection to network 126(2), and user device 108(n) includes a connection to network 126(n).

Additionally, apart from the cellular network 102, the cellular network environment 100 includes multiple web servers 128 that may be accessed through the Internet 118.

In an example embodiment, the core network 106 may implement a location server to remotely establish and pin the calculated 3D positions of the AP devices 112 in the building 114. To calculate the 3D positions of the AP devices 112(1)-112(3), the location server may correlate the vector coordinates in the building footprint, which can be derived from a building footprint database 130, GPS locations of the probing user devices 108(1)-108(n), and distances between the probing user devices 108(1)-108(n) and the vector coordinates. The building footprint database 130 may store the vector coordinates of the building footprint that can include the vector coordinates of the building plan, elevation, and/or section. Each vector coordinate may include a starting node, a terminal node, and their corresponding GPS locations. In one example, the GPS locations of the vector coordinates in the building footprint database 130 may be derived from Google aerial and land photographs, uploaded pictures, and/or actual building specifications contributed by participating user devices (not shown).

In one example, the servers 122 may include a location server application 132 that can be configured to calculate the 3D position of the AP device 112. The location server application 132 may further utilize the WiFi based-SLAM algorithm to generate the crowdsourced signal-fingerprint map 134 that includes reference data points for 3D localization. Each reference data point in the fingerprint map 134 may represent, for example, a pairing of a previously navigated physical location and signal measurements performed at the navigated physical location.

Further details of calculating the 3D position of the AP devices 112 are described in subsequent figures.

Example Calculation of 3D Position of the AP Device

Figure 2:
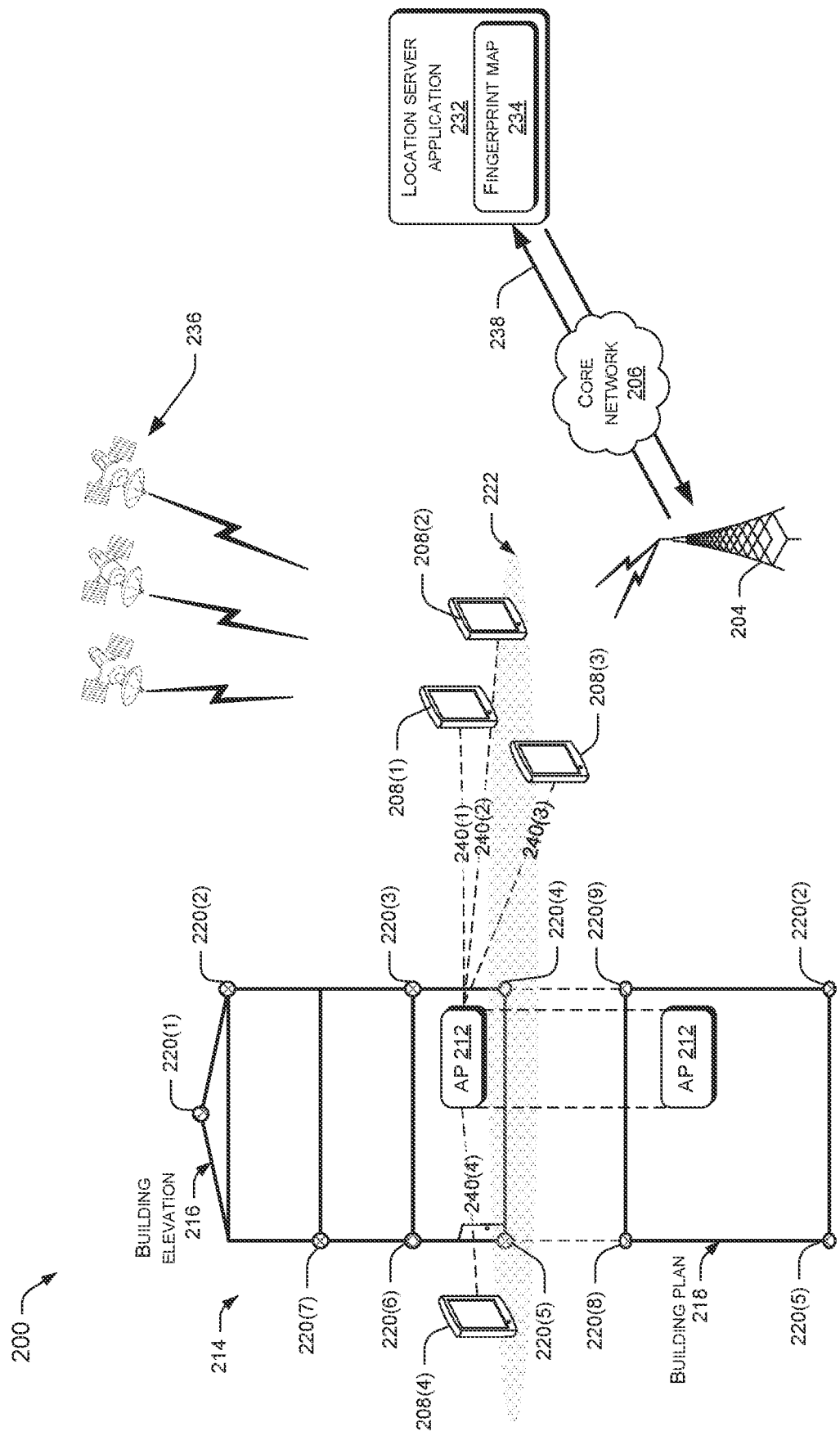
FIG. 2 illustrates an example diagram of a system that implements a calculation of a three dimensional (3D) position of an access point (AP) device, in accordance with at least one embodiment.

FIG. 2 shows an example diagram 200 that illustrates a calculation of the 3D position of the AP device based upon GPS locations of probing user devices, signal measurements taken by the user devices, and the building footprint that can be downloaded from the building footprint database. The calculated 3D position of the AP device may be added as vector coordinates in the building footprint and can be used as references for developing a crowdsourced signal-fingerprint map as described herein.

As an initial step, the network server (e.g., servers 122 of FIG. 1) may receive signal measurements from the probing user devices that are within a threshold distance from a vector coordinate of a particular building. The signal measurements, for example, may be taken by the user devices from signals transmitted by an AP device. The network server may use the received signal measurements in a trilateration method to obtain a calculated 3D position of the AP device. The network server may further correlate the calculated 3D position of the AP device with a downloaded building footprint to pin the AP device to its corresponding location in the building. Thereafter, the network server may facilitate developing of the building fingerprint map by collecting reference data points from the user device that may be navigating pathways within the building for the first time. Alternatively, or additionally, WiFi signal triangulation may be used for the reference data points.

The example diagram 200 shows a base station 204, a core network 206, user devices 208(1)-208(4), a single AP device 212 for purpose of illustration, a building 214 with a building elevation 216, and a building plan 218, vector coordinates 220(1)-220(9), a distance threshold coverage range 222, location server application 232, fingerprint map 234, and a subset of GPS satellites 236. The base station 204, core network 206, building 214, etc. shown in FIG. 2 may correspond to the base station 104, core network 106, building 114, etc. shown in FIG. 1.

In one example, the location server application 232 may download the building elevation 216, building plan 218, and associated vector coordinates 220 from the building footprint database (e.g., building footprint database 130 of FIG. 1). The building elevation 216 may include a vertical side view of the building 214 while the building plan 218 may include a top view. In some cases, a building section (not shown) and associated vector coordinates may be also downloaded for reference in the calculation of the 3D position of the AP device 212. Each one of the vector coordinates 220 and particularly, the vector coordinates of the building plan 218 may be associated with a segment, nodes of the segment, and GPS locations of the nodes. These vector coordinates may be derived by an open source application (not shown) from a top/side/front/back view photo of the building or from uploaded building specifications.

With the downloaded building footprint, the location server application 232 may use the threshold distance coverage range 222 to identify the user devices 208(1)-208(4) that may be located in the vicinity of the building 214. In one example, the threshold distance coverage range 222 may represent a coverage area defined by a radius of 50 meters from one of the vector coordinates (e.g., vector coordinate 220(4)). Further, the identified user devices 208(1)-208(4) may include subscriber client devices of a mobile network operator (MNO) that operates the location server application 232.

Upon identification of the user devices 208(1)-208(4) that are within the threshold distance coverage range 222, the location server application 232 may request these identified user devices to probe surrounding signals such as the signals coming from the AP device 212. The probing of the surrounding signals may include measuring of RSSI, RSRP, and AoA of broadcasted signals and receiving MAC addresses associated with the broadcasted signals.

The location server application 232 may receive the signal measurements and the MAC addresses from the user devices 208(1)-208(4) and use these signal measurements in a trilateration method to calculate the 3D position of the signal sources. The calculation of the 3D position may be referenced from the GPS locations of the probing user devices 208(1)-208(4). In one example, the location server application 232 may use the vector components 220(1)-220(9) and the known locations of the one or more probing user devices 208(1)-208(4) to identify the calculated 3D position that overlaps with the building plan 218. The signal source that is associated with the calculated 3D position that overlaps with the building plan 218 may indicate that the signal source is located within the building.

To pin the calculated 3D position of the AP device 212 in the building 214, the location server application 232 may correlate the distances between the calculated 3D position of the AP device 212 and the known GPS locations of the probing user devices 208(1)-208(4), vector coordinates 220(1)-220(9) of the building elevation 216 or building plan 218, and determined distances between the GPS locations of the probing user devices and the vector coordinates. The pinning of the calculated 3D position of the AP device 212 may be similar to adding the calculated 3D position as another vector coordinate in the building 214.

For example, the trilateration method uses distances 240(1)-240(4) between the AP device 212 and the GPS locations of the four user devices 212(1)-212(4), respectively, to calculate the AP device 212's position in 3D space. Given this 3D position of the AP device 212, the location server application 232 may compute the spaces between the GPS locations of the four user devices 212(1)-212(4) and the vector coordinates 220 to pin the 3D location of the AP device 212 in the building footprint of the building 214.

The construction of the fingerprint map 234 that may utilize the pinned positions of the AP device 212 and the vector coordinates 220 is further described below.

Example Construction of the Fingerprint Map

Figure 3:
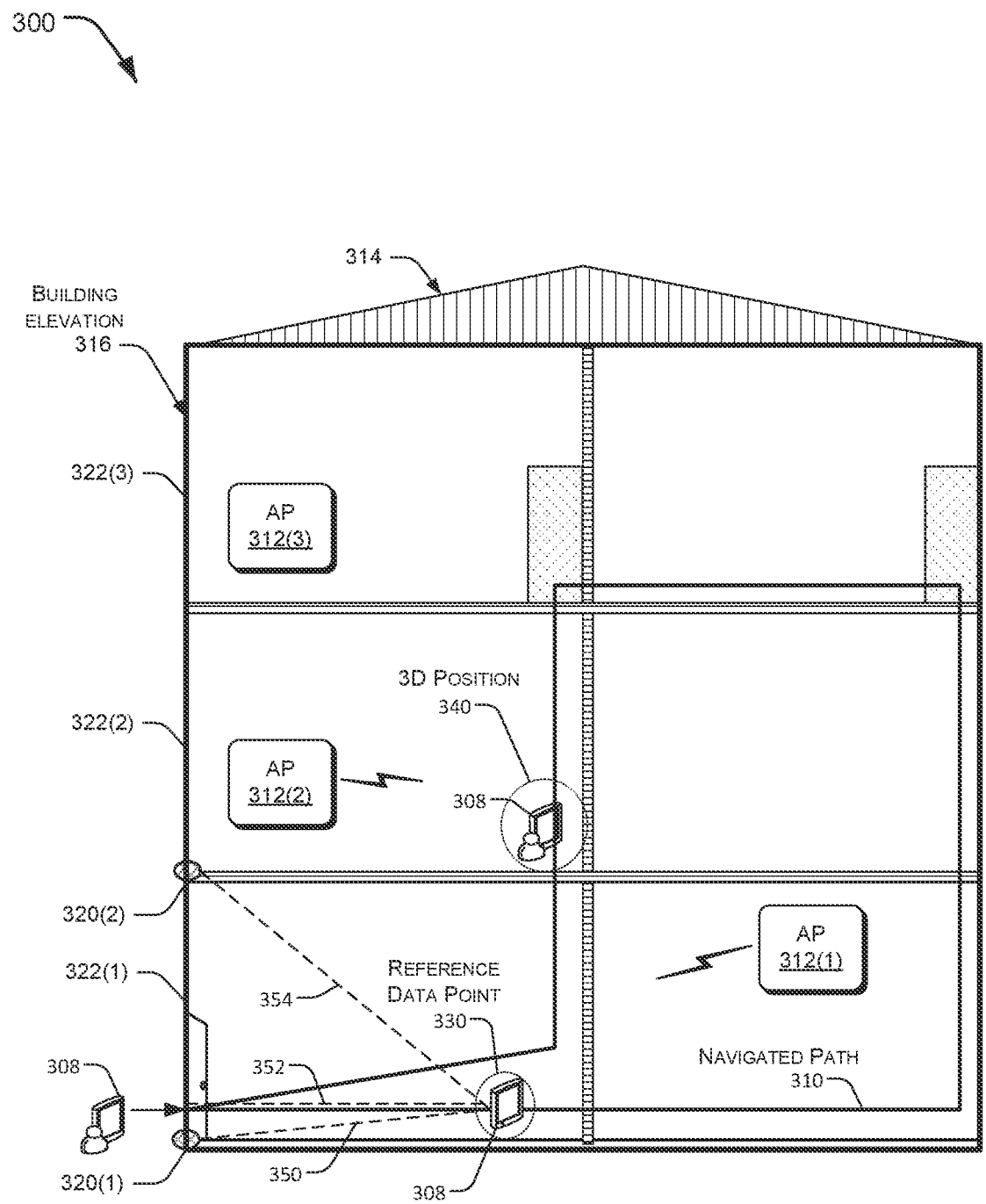
FIG. 3 illustrates an example diagram of a system that implements a construction of a fingerprint map for determining an indoor location of a user device, in accordance with at least one embodiment.

FIG. 3 illustrates an example diagram 300 showing the developing of the fingerprint map by collecting reference data points that include pairings of physical locations detected by built-in sensors of the user device and signal measurements taken at the detected physical locations. In one example, the built-in sensors may include an inertial navigation system (INS) component with a dead reckoning navigation feature where a calculation of a particular physical location segment or point at a particular timestamp may not require external references for measurement. That is when the user device moves from a starting point $(X_1, Y_1, Z_1)$ to a stopping point $(X_2, Y_2, Z_2)$ between time steps "t−1" to "t," the INS component may generate a segment with an ending point/node having a distance (D) of $[(X_2-X_1)^2+(Y_2-Y_1)^2+(Z_2-Z_1)^2]^{1/2}$ from the starting point $(X_1, Y_1, Z_1)$. By leveraging, however, the known vector coordinates of the building as a reference point for the INS component and associating signal measurements taken at each navigated point, the user device may be able to upload these pairings as reference data points for the fingerprint map.

In one example, these reference data points of the fingerprint map may be used to determine the current indoor location of the user device. For example, the user device may be detected to revisit a physical location and measures signals in that physical location. In this example, the network server may search for matching signal measurements and generate the physical location associated with the matching signal measurements as the current location of the user device. Alternatively, or additionally, the user device may use triangulation from a plurality of AP devices to determine its indoor location in 3D space within the building.

FIG. 3 shows a user device 308 that is navigating a path 310, AP devices 312, a building 314 with a building elevation 316 and vector coordinates 320, building floors 322, an example reference data point 330, and an example calculated 3D position 340 of the user device 308. The AP devices, building elevation, vector coordinates, etc. may correspond to the AP devices, building elevation, etc. in the other figures.

In one example, the fingerprint map may be developed from collected reference data points on the path 310 navigated by the user device 308. For example, the user device 308 may use the INS component (not shown) with dead reckoning navigation features to calculate its indoor physical location as it navigates the path 310. The user device 308 may further use the vector coordinates 320(1) and 320(2), building elevation 316, perimeter nodes from a building plan (not shown), and building section (not shown) as references for the calculation of its indoor physical location. At a particular instant, the user device 308 may upload to the network server a reference data point that includes a pairing of a calculated physical location and signal measurements taken from the calculated physical position. For the example reference data point 330, the physical location of the user device 308 may be calculated from distances 350-354, which can be determined from known fix points in the building. The distance 350 may include a segment from the vector coordinate 320(1) after a particular time step "t" to "t+1," the distance 354 may include a segment from the vector coordinate 320(2) after the particular time step "t" to "t+1," and distance 352 may include a distance from the building perimeter at time step "t+1."

With the collected reference data points in the path 310, the 3D position of the user device 308 may be calculated based upon similarity of signal measurements taken by the user device 308 in the revisited reference data point such as the 3D position 340. For example, the developed fingerprint map may include the collected reference data points in the path 310. In this example, when the user device subsequently traverses the same reference data point, the signal measurements in the traversed reference data point may be used to determine the physical location of the revisiting user device. In an example embodiment, the detection of the revisited reference data point may be based upon temporal coherence between the signal measurement similarities and spatial coherence as further described in subsequent figures.

Alternatively, or additionally, the WiFi triangulation may be used to detect the 3D position 340 of the user device 308.

Example User Device Components

Figure 4:
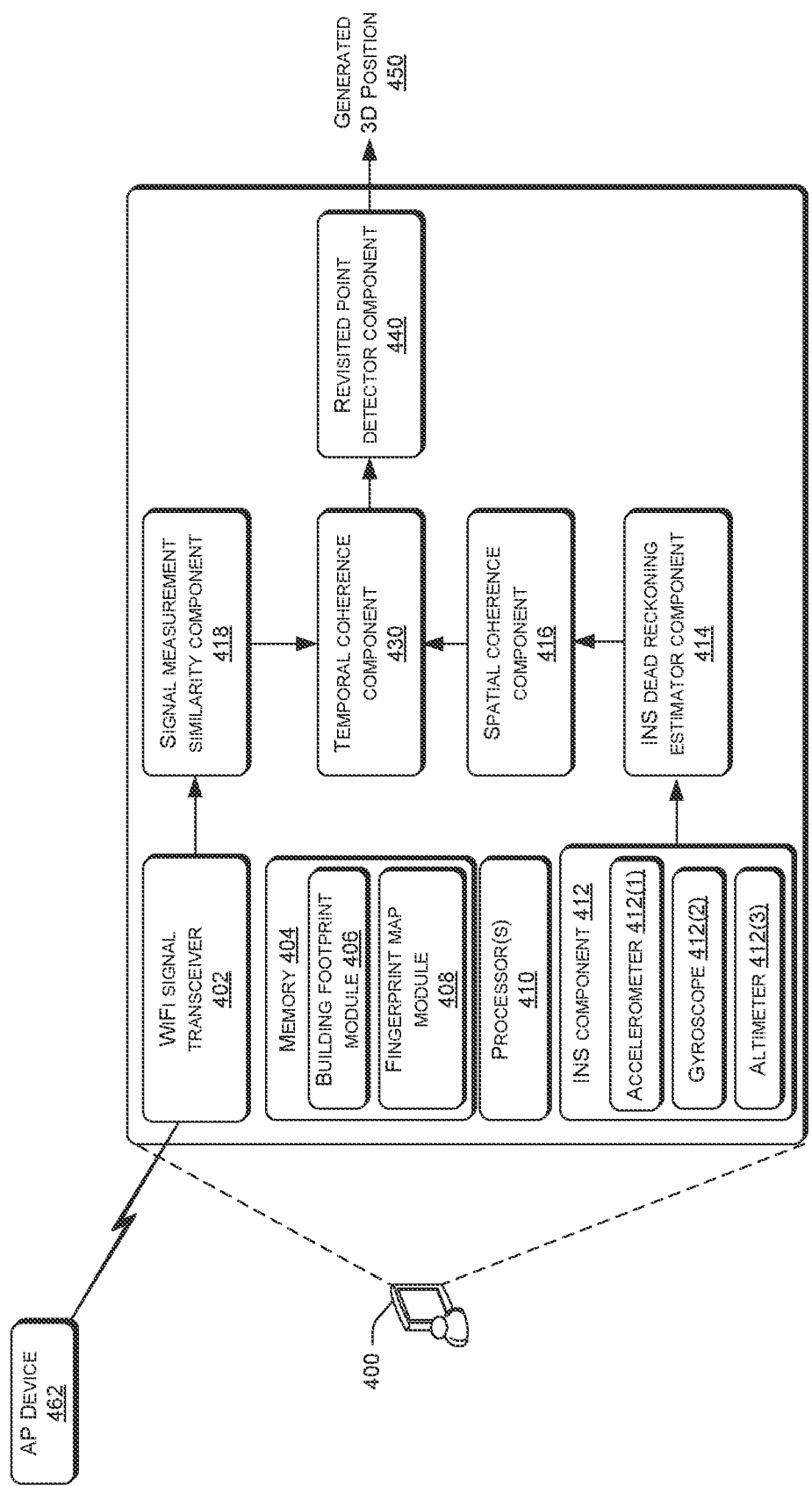
FIG. 4 is a block diagram showing various components of an illustrative user device, in accordance with at least one embodiment.

FIG. 4 is a block diagram showing various components of an illustrative user device 400 that may be used to detect the physical location of the wireless device in 3D space. In one example, the user device 400 may be used as a probing user device to calculate the 3D position of the AP device as described in FIGS. 1-3. In another example, the user device 400 may be used to develop the fingerprint map. In the discussion below, the user device 400 is used to improve the detection of a revisited reference data point based on temporal coherence between signal measurement similarity and spatial coherence. Upon detection of the revisited reference data point, the user device 400 may use the associated 3D position as its actual indoor physical location (similar to 3D position 340 of FIG. 3). Alternatively, or additionally, the user device 400 may use WiFi triangulation to determine its physical location in 3D space.

As shown, the user device 400 may include a WiFi signal transceiver 402, a memory 404 with a building footprint module 406 and a fingerprint map 408, one or more processor(s) 410, INS component 412, an INS dead reckoning estimator component 414, a spatial coherence component 416, a signal measurement similarity component 418, temporal coherence component 430, a revisited point detector component 440, and a generated 3D position 450. FIG. 4 further shows an AP device 462 that may correspond to the AP devices 112(1)-112(3), 212, or 312(1)-312(3) in FIGS. 1, 2, and 3, respectively.

The WiFi signal transceiver component 402 may include a hardware circuit component that can scan and perform signal measurements of wireless signals such as the signals coming from the AP device 462. The WiFi signal transceiver component 402 may send the signal measurements (e.g., RSSI measurement) to the signal measurement similarity component 418 that may be configured to search for a matching signal measurement in the fingerprint map 408. As described above, the fingerprint map 408 may include collected reference data points such as the data points from the navigated path. Given a situation where a matching signal measurement is found, then this may indicate a coarse indicator that the user device 400 has detected a revisited reference data point. At this stage, the coarse indicator may be used to retrieve the associated physical location in the fingerprint map 408 due to the underlying assumption that the same physical location may correspond to the same signal measurements; however, the additional checking of spatial coherence as described below may be used to further improve the accuracy of this detection.

The signal measurement similarity component 418 may include a hardware circuit component that updates current samples of signal measurements from a previous time step. In one example, the signal measurement similarity component 418 may receive RSSI measurement from the AP device 462 and compare the received RSSI measurement with previously-stored samples such as the RSSI measurements associated with reference data points in the fingerprint map 408.

The INS component 412 may include motion sensors, such as an accelerometer 412(1), a gyroscope 412(2), and an altimeter 412(3). The INS component 412 may also include other components such as magnetometer (not shown) and the like. In one example, during the collection of reference data points to develop the fingerprint map 408, the INS component 412 may use the accelerometer 412(1), the gyroscope 412(2), and the altimeter 412(3) when navigating a path such as the path 310 of FIG. 3.

The INS dead reckoning estimator component 414 may be configured to continuously calculate position, orientation, direction, and speed of movement of the user device 400 at every time step (e.g., time step "t"). The calculation of the position, orientation, direction, and speed may be performed without the need for external references. In one example, the calculation at multiple time steps may generate physical location measurement data at each segment of the navigated path. For example, the user device 400 moves from $(X_1, Y_1, Z_1)$ to $(X_2, Y_2, Z_2)$ coordinates between time steps "t–1" to "t." In this example, the generated segment may include a distance (D) that is equal to $[(X_2-X_1)^2+(Y_2-Y_1)^2+(Z_2-Z_1)^2]^{1/2}$.

Spatial coherence component 416 may include a hardware circuit that takes into consideration a spatial similarity of a generated local trajectory structure of the user device 400 at multiple time steps. For example, around the same physical location, the estimated motion trajectory may have a similar spatial structure. The principle of spatial coherence may be implemented to distinguish trajectories with different local structures at different time steps t, t+1, t+2, etc. The spatial coherence principle may be imposed by taking into account quality of matching according to an estimation of the local structures. To this end, an output for the spatial coherence implementation may provide a good indication of spatial coherence level (or confidence level) of similarities in the measurements data to detect the revisiting of the reference data point. The spatial coherence implementation may use standard computational algorithms to correlate the motion estimation at different time steps t, t+1, t+2, etc.

In one example, the temporal coherence component 430 may implement temporal coherence processing between the: a) spatial coherence level that is derived from the spatial coherence component 416; and b) the determined signal measurement similarities from the signal measurement similarity component 418. In this example, the temporal coherence may apply standard computational algorithms to correlate the spatial coherence level from the output of the spatial coherence component 416 and the determined similarities in the signal measurements at different time steps. For example, the temporal coherence component 430 may use a multiple sequence alignment algorithm to identify regions of similarity between the obtained spatial coherence level and the determined wireless signal similarities in order to estimate the detection of the traversal of the reference data point at a particular time step. In this example, the temporal coherence component 430 may generate alignment results at the particular time step that can be used as an indication of the revisiting of the reference data point.

The revisited point detector component 440 may include a hardware circuit component that uses a threshold for estimating the detection of the revisiting of the reference data point. The threshold may be configured to include a minimum length of the matching sequence to declare the detection of the "revisited reference data point." For example, the threshold includes a matching sequence threshold of five to gauge matching confidence level. In this example, the temporal coherence component 430 generates at least five positive matches before the user device outputs the detection of the traversal of the reference data point.

The processor(s) 410 may be a central processing unit(s) (CPU), graphics processing unit(s) (GPU), both a CPU and GPU, or any other sort of processing unit(s). Each of the one or more processor(s) 410 may have numerous arithmetic logic units (ALUs) that perform arithmetic and logical operations as well as one or more control units (CUs) that extract instructions and stored content from processor cache memory, and then executes these instructions by calling on the ALUs, as necessary during program execution.

The one or more processor(s) 410 may also be responsible for executing all computer applications stored in the memory, which can be associated with common types of volatile (RAM) and/or non-volatile (ROM) memory. Additional hardware components such as additional user interface, data communication, or data storage hardware may connect to the processor(s). For example, the user interfaces may include a data output device (e.g., visual display, audio speakers), and one or more data input devices. The data input devices may include but are not limited to, combinations of one or more of keypads, keyboards, mouse devices, touch screens that accept gestures, microphones, voice or speech recognition devices, and any other suitable devices.

The memory 404 may be implemented using computer-readable media, such as computer storage media. Computer-readable media includes, at least, two types of computer-readable media, namely computer storage media and communications media. Computer storage media includes volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanisms. The memory 404 may also include a firewall. In some embodiment, the firewall may be implemented as hardware in the user device 400.

The building footprint module 406 may store the building plan, building elevation, building section, and associated vector coordinates that may be downloaded from the building footprint database. The fingerprint map 408 may store the reference data points that may be downloaded from the location server application in the network server. The fingerprint map 408 may correspond to the fingerprint map 234 of the local server application 232 of FIG. 2.

The example user device 400 described herein is merely an example that is suitable for some embodiments and is not intended to suggest any limitation as to the scope of use or functionality of the environments, architectures and frameworks that may implement the processes, components and features described herein.

Example Spatial Coherence

Figure 5:
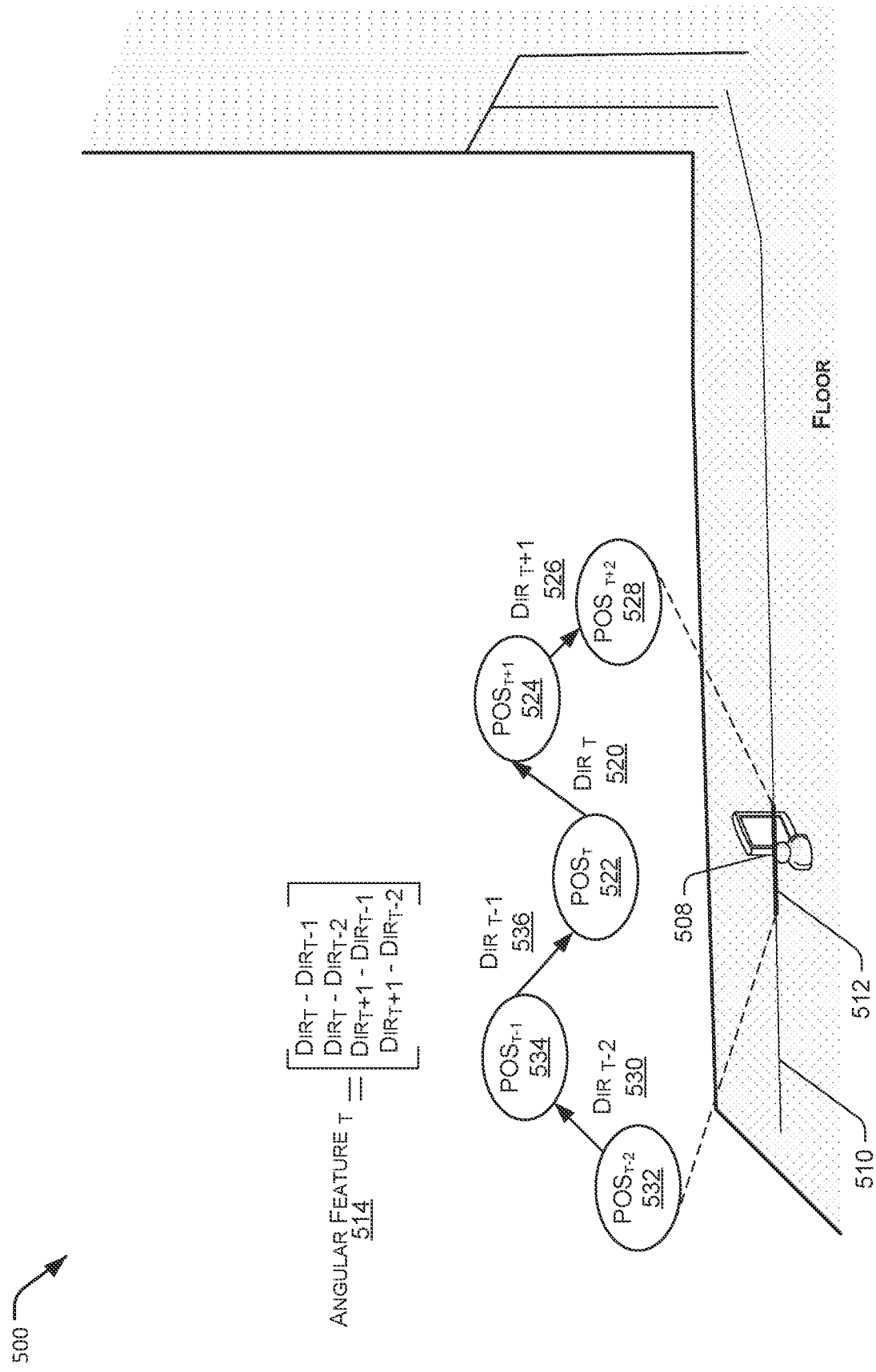
FIG. 5 illustrates an exemplary spatial coherence feature that can be used to detect a revisiting of a reference data point in the fingerprint map, in accordance with at least one embodiment.

FIG. 5 illustrates an exemplary spatial coherence implementation 500 that generates spatial coherence levels at multiple time steps. The spatial coherence level may indicate spatial structure similarity between matched spatial coherence features at different time steps. FIG. 5 shows a user device 508 navigating a path 510 and particularly, a segment 512 on the path 510. The segment 512 may include a revisited segment having five points in time (t−2, t−1, t, t+1, t+2). At each point in time (e.g., t), a corresponding spatial coherence angular feature 514 may be compared with a reference spatial coherence angular feature in order to generate a corresponding spatial coherence level. In one example, the spatial coherence analysis on the segment 512 is implemented when the user device 508 is requesting for a physical location detection. As described herein, the spatial coherence analysis may be implemented in parallel with the determination of the wireless signal similarities.

In an embodiment, the angular feature 514 may be defined to capture a local trajectory change that reflects the movement of the user device 508 along a floor section of a mapped building. The mapped building may indicate a mapping of the fingerprint map onto the building footprint of the building. In this embodiment, the captured local trajectory change may be assumed to be similar to the local trajectory change that was used to establish the navigated path 510. This assumption may then be used to detect the revisiting of the reference data point in the segment 512. For example, angular feature 514 may be used to estimate whether or not the segment 512 is a revisited reference data point. In this example, the angular feature 514 is compared to the stored angular feature at a previous time instant to determine the detection of the traversed reference data point. The angular feature 514 may use multiple time-step scale manner ("t−2" to "t") in order to deal with inaccurate detection of motions in the INS component 412 based on measurement data. In other embodiments, differently sized time-step windows may be implemented (e.g., time-step window size of 3, 4, or 6, etc.), and time-step window size can be adaptively adjusted based on particular circumstances, conditions, and/or requirements.

With continuing reference to FIG. 5, $Dir_t$ 5020 represents the direction from estimated positions $Pos_t$ 522 to $Pos_{t-1}$ 524; $Dir_{t-1}$ 526 represents the direction from estimated positions $Pos_{t+1}$ 524 to $Pos_{t+2}$ 528; $Dir_{t-2}$ 530 represents the direction from estimated positions $Pos_{t-2}$ 532 to $Pos_{t-1}$ 534; and $Dir_{t-1}$ 536 represents the direction from estimated positions $Pos_{t-1}$ 534 to Post 522. The local structure trajectory defined by the $Pos_{t-2}$ 532 to $Pos_{t+2}$ 528 includes the segment for the time steps "t−2" to "t+2." In one example, the defined angular feature 514 is a vector consisting of the angular deviation from $Dir_{t-1}$ 536 to $Dir_t$ 520, from $Dir_{t-2}$ 530 to $Dir_t$ 520, from $Dir_{t-1}$ 536 to $Dir_{t-1}$ 526, and from $Dir_{t-2}$ 530 to $Dir_{t-1}$ 526. In this example, the angular feature 514 of the segment 512 at multiple time steps "t−2" to "t+2" may indicate whether or not the segment is a revisited segment or reference data point. That is, the angular feature 514 at multiple time steps "t−2" to "t+2" may be compared with stored reference angular features to obtain the spatial coherence level of the segment 512.

Example Determination of Wireless Signal Similarities

Figure 6:
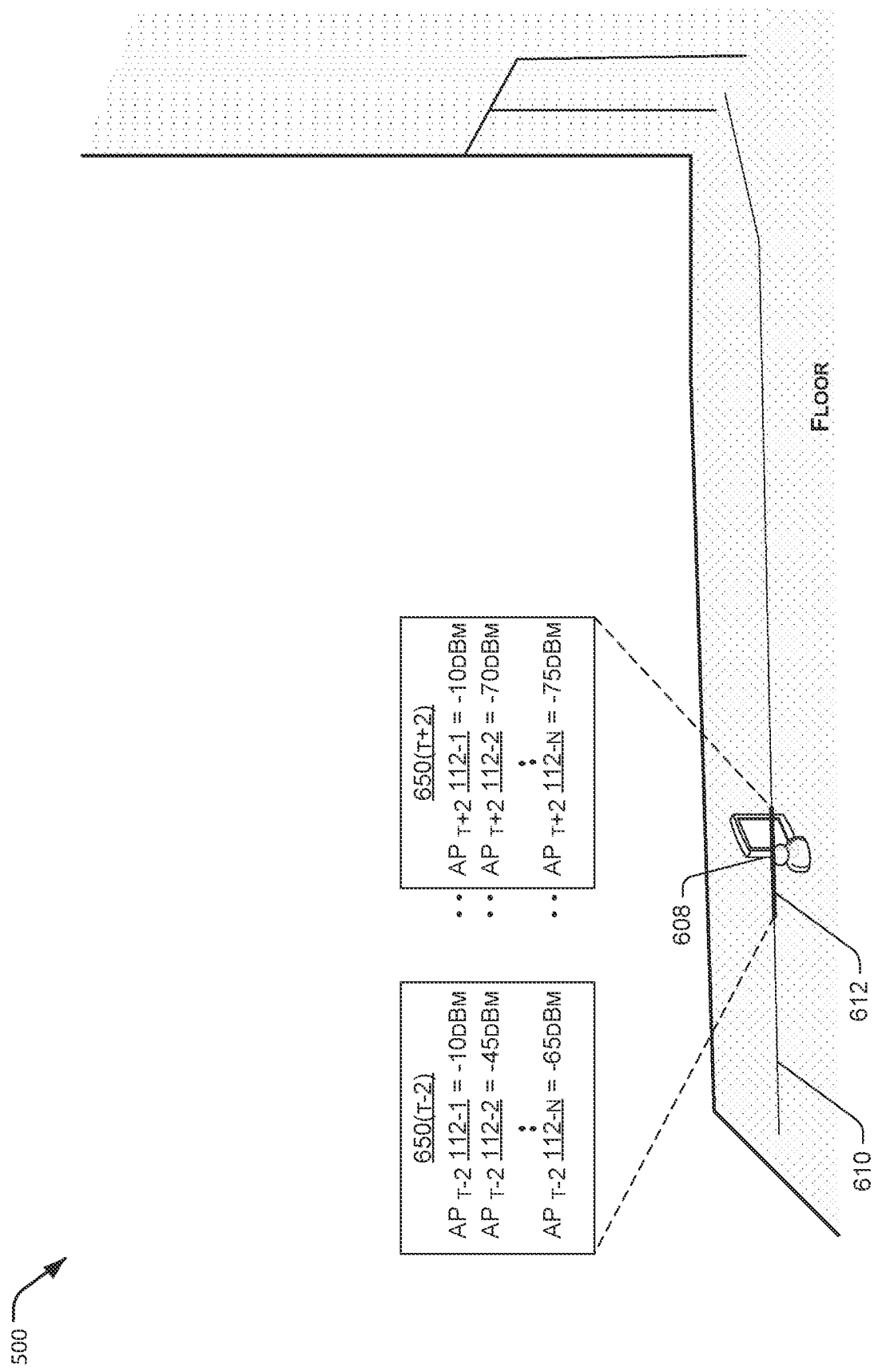
FIG. 6 illustrates an exemplary determination of wireless signal similarities that can be used to detect the revisiting of the reference data point, in accordance with at least one embodiment.

FIG. 6 illustrates a determination of wireless signals similarities that may be performed in parallel with the determination of spatial coherence level as described in FIG. 5. As described herein, the determined wireless signal similarities and the obtained spatial coherence level may be processed over multiple time steps in order to improve the detection of the revisiting of the reference data point. The detection may be implemented for purposes of detecting the traversal of the reference data point in the wireless signal fingerprint map to obtain the physical location of the device in 3D space.

FIG. 6 shows a user device 608 navigating a path 610 and particularly, a segment 612 on the path 610. As described in FIG. 5, the spatial coherence component may use the spatial coherence feature such as the angular feature 514 to obtain the vector of angular deviations over multiple time steps (e.g., t−2, t−1, t, t+1, t+2). The obtained angular feature 514 may be compared with the reference angular feature to obtain the spatial coherence level. Similarly, referring to FIG. 6, the user device 608 may receive in parallel a set of wireless signals 650 at each point of the multiple time steps. For example, and for the set of wireless signals 650(t−2), the user device 108 may receive −10 dBM of power from a first access point, −70 dBM of power from a second access point, and so on. In this case, the signal measurement similarity component 418 may use a fuzzy logic algorithm (not shown) to estimate signal similarities between a set of signal measurements different time periods. The fuzzy logic algorithm may output a similarity decision for a given set of comparable signal measurements.

In one example, the similarity decision may indicate a coarse indicator of the detection of the revisiting of the reference data point. The coarse indicator may be used as a reference to having the associated physical location in the fingerprint map as the actual physical location due to the underlying assumption that the same physical location may correspond to the same signal measurements; however, to further improve the accuracy of the detection of the revisiting of the reference data point, the temporal coherence of the spatial coherence level and the similarity decision is determined and compared to a matching sequence threshold as described below.

Example Temporal Coherence

Figure 7:
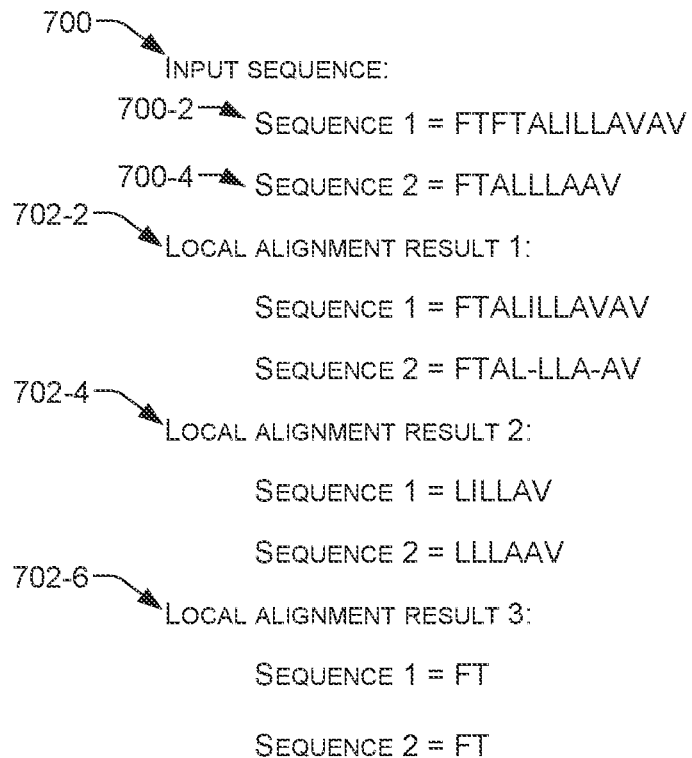
FIG. 7 illustrates an example sequence alignment for searching all possible lengths of a matching sequence, in accordance with at least one embodiment.

FIG. 7 illustrates sequence alignment examples for searching all possible lengths of a matching sequence. The example sequence alignment may be applied to capture the temporal coherence between the obtained spatial coherence level from the output of the spatial coherence component and the determined similarities in the wireless signals from the output of the signal measurement similarity.

In one example, the temporal coherence component captures the local structure similarity in consecutive time steps t, t+1, t+2, etc. For example, if a "revisiting of the reference data point" has occurred at one physical location at a particular time step, then the "revisiting" may similarly occur several time steps following the detected revisited reference data point as well. In this example, sequence alignment techniques may be implemented to extract coherent time subsequences. The sequence alignment technique may be based on a known fuzzy matching technique that includes approximation techniques rather than fixed and exact matches to find the correspondences.

In one example, the sequence alignment technique may extract a matching sequence of all possible lengths. Different existing algorithms for the sequence alignment technique may be implemented to extract the matching sequence of all possible lengths. For example, a basic sequence alignment technique is illustrated in FIG. 7. In this example, the similarity between pairs of entries (e.g., letter F, T, or A, etc.) is simply defined by equality. In one example, each of the entries (e.g., letter F, T, or A, etc.) is a compound of a spatial location level (e.g., angular feature 514 of FIG. 5) from the output of the spatial coherence and a set of wireless signal measurements from the output of the signal measurement similarity. The matching sequence threshold (e.g., five steps) can be used as the temporal coherence measure to gauge matching confidence level. The longer matched sequence may provide a more confident level of a positive match.

With continuing reference to FIG. 7, the algorithm may include an input sequence 700 that includes a first sequence 700-2 and a second sequence 700-4. The first sequence 700-2 may include the entries (e.g., letter F, T, or A, etc.) that contains the compound of the spatial location (e.g., angular feature) and the determined wireless signal similarities from the processor(s). Similarly, the second sequence 700-4 may include the entries (e.g., letter F, T, or A, etc.) that contains the compound of the spatial location and the determined wireless signal measurements from the output of the signal measurement similarity at different time steps. In one example, the first sequence 700-2 is compared with the second sequence 700-4. In this example, more than one local alignment results 702 may be generated on the two sequences (i.e., sequences 700-2 and 700-4) that are compared to output the temporal coherence.

Example Process for Remote Calculation AP Device in a Building

Figure 8:
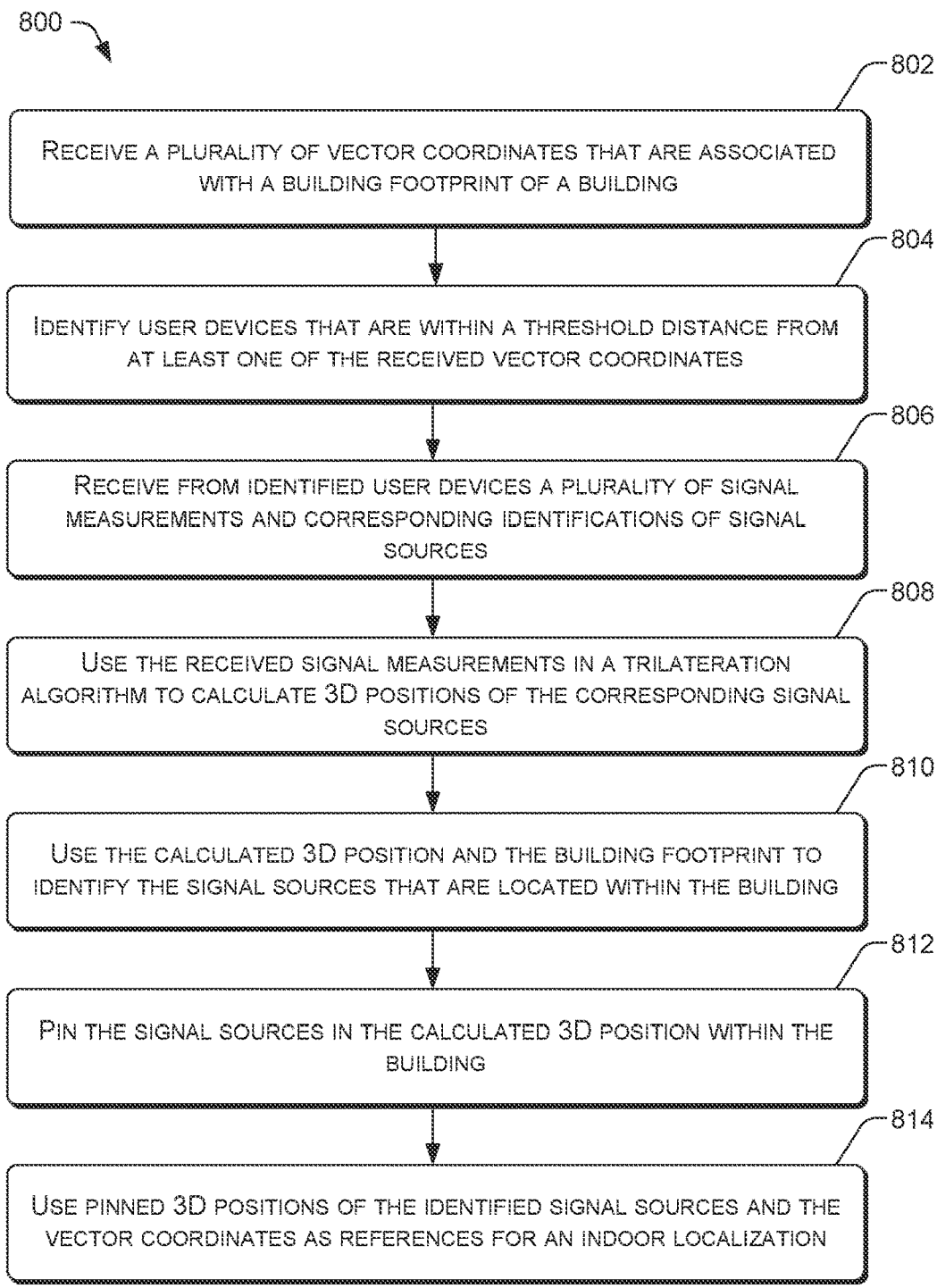
FIG. 8 is a flow diagram of an example process for calculating a 3D position of an AP device in an indoor environment, in accordance with at least one embodiment.

FIG. 8 is a flow diagram of an example process 800 for calculating a 3D position of the AP device in an indoor environment based at least on downloaded building footprint and signal measurements taken by the probing user devices. At block 802, a location server application in a network server may receive a plurality of vector coordinates associated with a building footprint of a building. For example, the vector coordinates are associated with a building plan, elevation, and/or section. The vector coordinates may include nodes with corresponding GPS locations.

At block 804, the location server application in the network server may identify the user devices that are within a threshold distance from at least one of the received vector coordinates. For example, the threshold distance may include a radius to form the distance threshold coverage range 222 of FIG. 2. In some cases, the location server application may identify the user devices that are outside of a particular building because of their ability to track their respective GPS locations. The identified user devices may include subscribers of the MNO that runs the location server application.

At block 806, the location server application may receive from the identified user devices a plurality of signal measurements and corresponding identification of signal sources. The signal measurements may be coming from different signal sources such as the AP device, microcell, a base station, and the like. The identification may include MAC addresses, base station IDs, and the like.

At block 808, the location server application may use the signal measurements in a trilateration method to calculate the 3D position of the signal sources. In one example, the location server application may signal measurements from different user devices in a trilateration method to calculate the corresponding 3D positions of the signal sources.

At block 810, the location server application may use the calculated 3D position and the building footprint to identify the signal sources that are located within the building. In one example, AP devices may be identified by their MAC addresses, frequency of transmitted signals, and the like.

At block 812, the location server application may pin the identified signal sources in the corresponding calculated 3D position within the building.

At block 814, the location server application may use the pinned 3D positions of the identified signal sources (e.g., indoor AP devices) and the vector coordinates as references for an indoor localization. For example, the user device may collect reference data points as the user device navigates a path in the building.

Example Process for Constructing A Fingerprint Map for an Indoor Space

Figure 9:
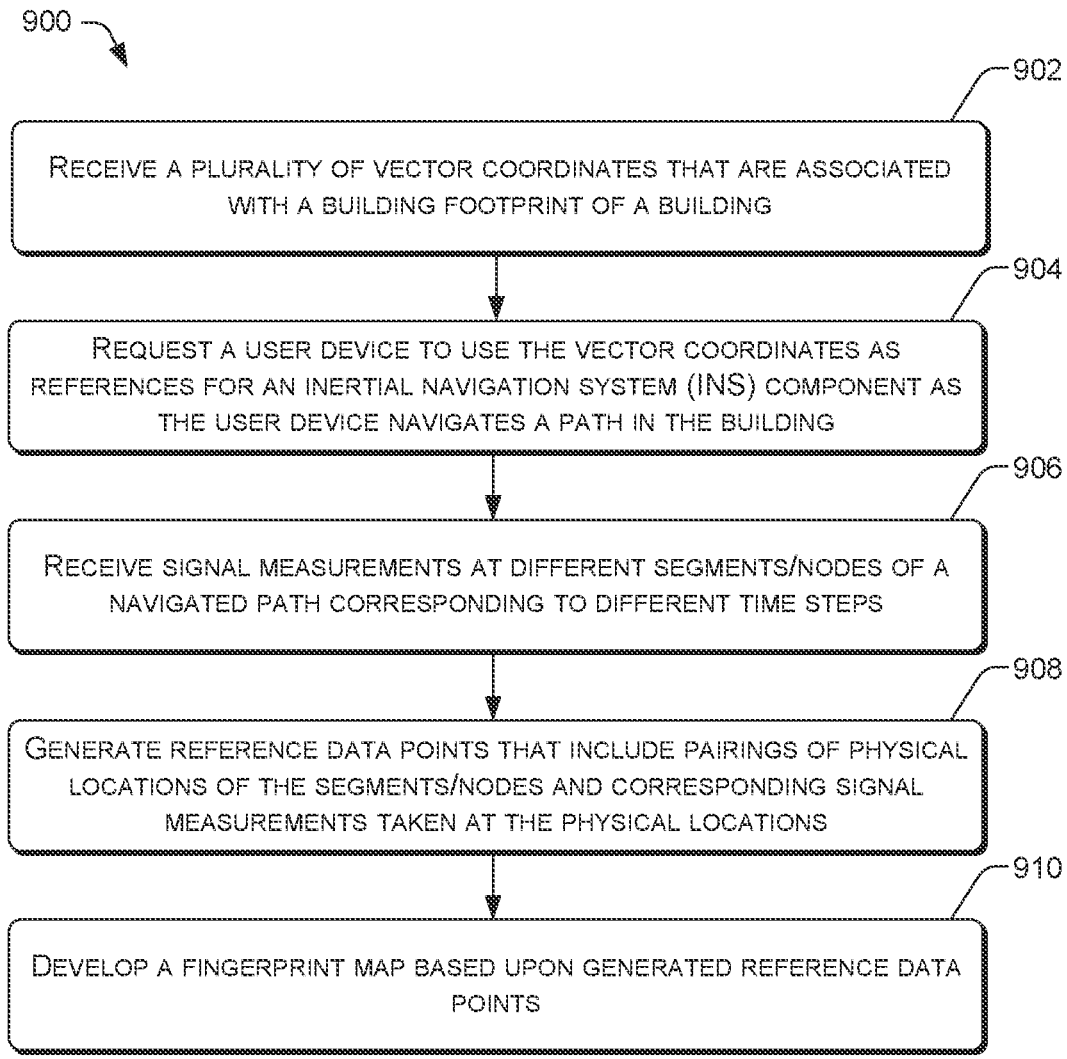
FIG. 9 is a flow diagram of an example process for constructing the fingerprint map, in accordance with at least one embodiment.

FIG. 9 is a flow diagram of an example process 900 for constructing a fingerprint map that can be used for a 3D indoor localization. In one example, the construction of the fingerprint map may be performed at the network server. At block 902, the location server application may receive a plurality of vector coordinates associated with a building footprint of a building.

At block 904, the location server application may request the user device to use the vector coordinates as references for its INS component as the user device navigates a path in a particular building. In one example, the location server application may request the user device to utilize the vector coordinates in initializing its INS component and INS dead reckoning estimator component when navigating a path in the building. In this example, the path is to be traversed for the first time.

At block 906, the location server application may receive signal measurements at different segments/nodes of a navigated path corresponding to different time steps. In one example, the user device may perform signal measurements at multiple time steps. Each time step may correspond to an identified physical location of a node, point, or segment in the navigated path.

At block 908, the location server application may generate reference data points that include a pairing of physical locations of the segments/nodes and corresponding signal measurements at the physical locations.

At block 910, the location server application may develop/construct the fingerprint map based upon the generated reference data points.

Alternatively, or additionally, the location server application may generate the reference data points based upon a WiFi signal triangulation method that may use multiple signal measurements from different signal sources such as AP devices.

Example Process for Detecting a Revisited Reference Data Point

Figure 10:
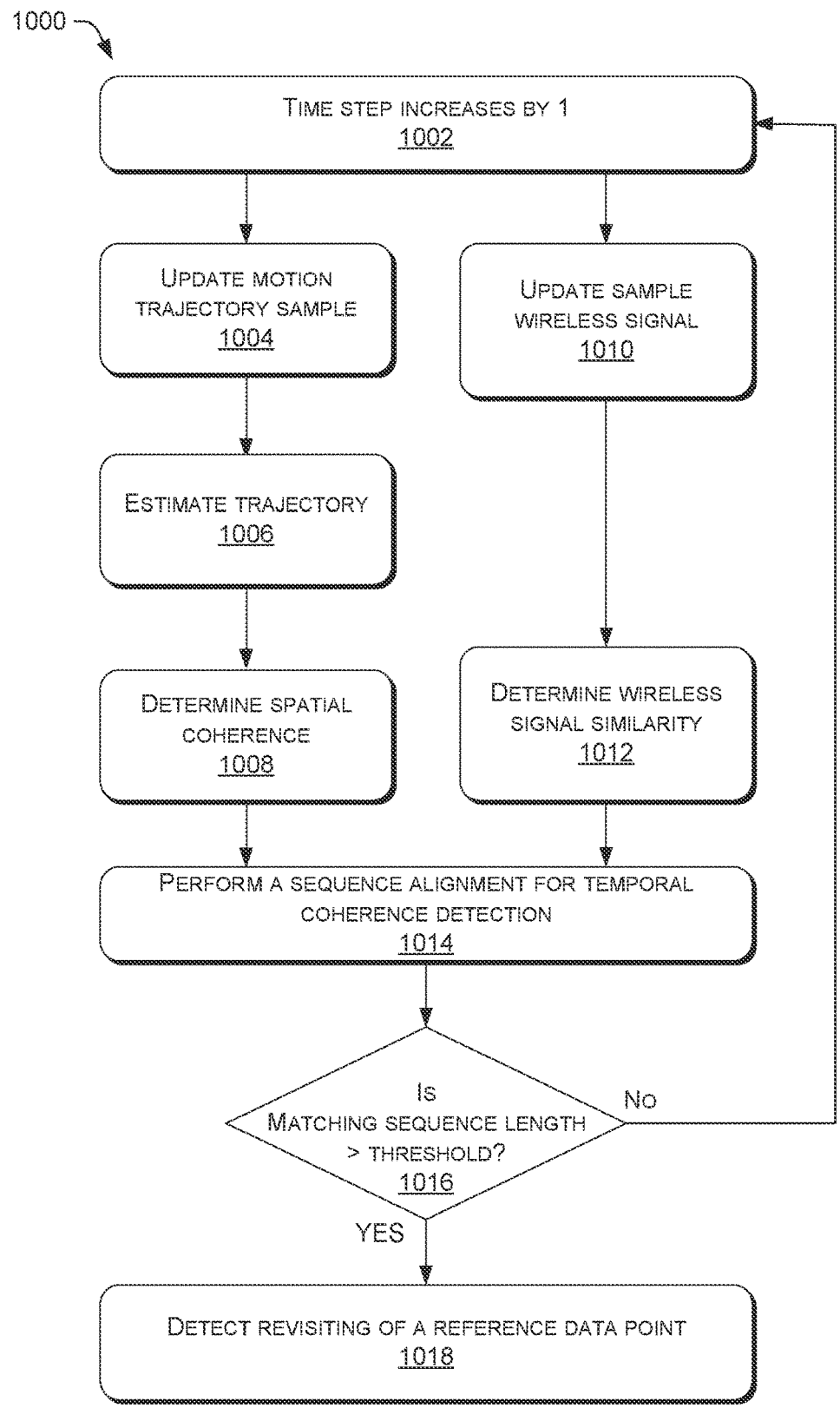
FIG. 10 is flow diagram of an example process for detecting a revisiting of the reference data point, in accordance with at least one embodiment.

FIG. 10 is a flow diagram of an example process 1000 for improving the detection of the revisiting of the reference data point in the constructed fingerprint map. Upon detection of the revisiting of the reference data point, the location server application may generate the associated physical location of the node as the 3D position of the revisiting user device. In one example, the example process 1000 below may be performed by the user device. Alternatively, the location server application may initiate the process through the user device.

At block 1002, a user device may initialize and increase a time step by one. In one example, a time step (e.g., timestamp t) is initialized to a particular number or state. The time step is increased to one step to obtain a current time step. For example, the time step increment may include a few milliseconds or few seconds.

At block 1004, the user device may update an inertial sample. In an embodiment, an INS component (e.g., INS component 412) may perform measurements at the current timestamp. The measurement data may include at least acceleration, orientation, and/or altitude of the user device.

At block 1006, the user device may estimate trajectory based on the updated sample and previously measured data. The estimated trajectory may include a segment that can be defined by measurement data at multiple time steps, such as "t," "t−1," "t−2," etc. For example, the wireless device moves from $(X_1, Y_1, Z_1)$ to $(X_2, Y_2, Z_2)$ coordinates between time steps "t−1" to "t." In this example, the processor(s) 410 may calculate the segment to include a distance (D) that is equal to $[(X_2-X_1)^2+(Y_2-Y_1)^2+(Z_2-Z_1)^2]^{1/2}$.

At block 1008, the user device may determine spatial coherence feature of the measurement data is performed. For example, spatial coherence component may implement spatial coherence algorithm to correlate motion estimation at different time steps. At each time step, the spatial coherence algorithm may determine the spatial coherence feature such as the angular feature of a particular segment, which provides an indication of whether the particular segment includes the revisited reference data point as described herein. In this example, the angular feature is matched with the reference spatial coherence feature from a previous time instant to generate the spatial coherence level. The spatial coherence level may indicate spatial structure similarity between the matched angular features.

At block 1010, the user device may update concurrently wireless signal samples at the current timestamp. For example, the WiFi signal transceiver component may receive wireless signals at the updated time step at block 1002. In this example, the wireless signals are updated at the current timestamp and in parallel with the updating of the inertial sample at block 1004.

At block 1012, the user device may determine signal similarities between the updated wireless signal samples and previously recorded and/or received wireless signals. For example, the processor(s) may perform a sequence alignment to determine similarities between the updated samples and the wireless signal samples that were previously stored at the previous time step.

At block 1014, the user device may perform a sequence alignment for temporal coherence detection. In an embodiment, a temporal coherence component (e.g., temporal coherence component 430) may perform the sequence alignment on the outputs of blocks 1008 and block 1012 to provide a matching sequence length.

At decision block 1016, the user device may determine whether the matching sequence length exceeds a sequence length threshold. In an embodiment, the temporal coherence component is configured to include the threshold when performing several matchings of an input sequence (e.g., input sequence 700). If the sequence length threshold is satisfied ("yes" from block 1016), then the process proceeds to block 1018, the revisiting of the reference data point is detected. If the sequence length is below the predetermined threshold ("no" from block 1016), the time step is increased by 1 at block 1002.

CONCLUSION

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. One or more non-transitory computer-readable media storing computer-executable instructions that upon execution cause one or more processors to perform acts comprising:
   receiving, from a building footprint database, a developed fingerprint map that includes a plurality of collected reference data points on a navigated path, wherein the reference data points include stored wireless signal measurements and angular features that are associated with corresponding segments on the navigated path;
   receiving, from a user device, a plurality of wireless signal measurements and an angular feature over multiple time steps;
   determining a wireless signal similarity between the received wireless signal measurements and the stored wireless signal measurements;
   determining a spatial similarity between the angular feature and the stored angular features;
   detecting a revisiting of a segment on the navigated path based on the determined wireless signal similarity and spatial similarity; and
   identifying an indoor location of the user device based on the detected revisited segment.

2. The one or more non-transitory computer-readable media of claim 1, wherein each reference data point represents a pairing of a navigated physical location and the wireless signal measurements taken at the navigated physical location.

3. The one or more non-transitory computer-readable media of claim 1, wherein the acts further comprise:
   performing a sequence alignment on the spatial similarity and the wireless signal similarity to provide a matching sequence length; and
   comparing the matching sequence length to a sequence length threshold to detect the revisiting of the segment on the navigated path.

4. The one or more non-transitory computer-readable media of claim 1, wherein the angular feature includes a captured local trajectory change that reflects a movement of the user device.

5. The one or more non-transitory computer-readable media of claim 4, wherein the angular feature is derived using an inertial navigation system (INS) component of the user device.

6. The one or more non-transitory computer-readable media of claim 1, wherein the wireless signal measurements include Wi-Fi Received Signal Strength Indicator (RSSI) measurements from access point (AP) devices in a building.

7. The one or more non-transitory computer-readable media of claim 1, wherein the determining of the wireless signal similarity includes use of a fuzzy logic algorithm.

8. The one or more non-transitory computer-readable media of claim 7, wherein the fuzzy logic algorithm indicates a coarse indication of the revisited segment on the navigated path.

9. The one or more non-transitory computer-readable media of claim 1, wherein the acts further comprise:
   determining temporal coherence between the determined wireless signal similarity and spatial similarity.

10. The one or more non-transitory computer-readable media of claim 9, wherein the determining temporal coherence uses a threshold to declare the detection of the revisited segment.

11. A computer system, comprising:
    one or more servers that, at least:
      receive, from a building footprint database, a developed fingerprint map that includes a plurality of collected reference data points on a navigated path, wherein the reference data points include stored wireless signal measurements and angular features that are associated with corresponding segments on the navigated path;
      receive, from a user device, a plurality of wireless signal measurements and an angular feature over multiple time steps;

determine a wireless signal similarity between the received wireless signal measurements and the stored wireless signal measurements;

determine a spatial similarity between the angular feature and the stored angular features;

detect a revisiting of a segment on the navigated path based on the determined wireless signal similarity and spatial similarity; and identify an indoor location of the user device based on the detected revisited segment.

12. The computer system of claim 11, wherein each reference data point represents a pairing of a navigated physical location and the wireless signal measurements taken at the navigated physical location.

13. The computer system of claim 11, wherein the acts further comprise:

performing a sequence alignment on the spatial similarity and the wireless signal similarity to provide a matching sequence length; and comparing the matching sequence length to a sequence length threshold to detect the revisiting of the segment on the navigated path.

14. The computer system of claim 11, wherein the angular feature includes a captured local trajectory change that reflects a movement of the user device.

15. The computer system of claim 14, wherein the angular feature is derived using an inertial navigation system (INS) component of the user device.

16. The computer system of claim 11, wherein the wireless signal measurements include Wi-Fi Received Signal Strength Indicator (RSSI) measurements from access point (AP) devices in a building.

17. The computer system of claim 11, wherein the determining of the wireless signal similarity includes use of a fuzzy logic algorithm.

18. A computer-implemented method, comprising:

receiving, from a building footprint database, a plurality of collected reference data points on a navigated path, wherein the reference data points include stored wireless signal measurements and angular features that are associated with corresponding segments on the navigated path;

receiving, from a user device, a plurality of wireless signal measurements and an angular feature over multiple time steps;

determining a wireless signal similarity between the received wireless signal measurements and the stored wireless signal measurements;

determining a spatial similarity between the angular feature and the stored angular features; and detecting a revisiting of a segment on the navigated path based on the determined wireless signal similarity and spatial similarity.

19. The computer-implemented method of claim 18, wherein the angular feature includes a captured local trajectory change that reflects a movement of the user device.

20. The computer-implemented method of claim 19, wherein the angular feature is derived using an inertial navigation system (INS) component of the user device.

* * * * *